United States Patent Office 3,241,969
Patented Mar. 22, 1966

3,241,969
PHOTOGRAPHIC SILVER HALIDE EMULSIONS
René Maurice Hart, 84 Pater Damiaanstraat, Wilrijk-Antwerp, Belgium, and Marcel Nicolas Vrancken, 31 Ringlaan, Berchem-Antwerp, Belgium
No Drawing. Filed Jan. 29, 1962, Ser. No. 169,593
Claims priority, application Great Britain, Jan. 27, 1961, 3,327/61
7 Claims. (Cl. 96—94)

The present invention relates to the preparation of photographic emulsions and more particularly to a process for removing the water-soluble salts from gelatino silver halide dispersions.

In our U.S. patent application Serial No. 137,042 we have described and claimed, in connection with the preparation of photographic gelatino silver halide emulsions, a method for removing water-soluble impurities therefrom. This method comprises adding to an aqueous gelatino silver halide dispersion an aqueous solution of a polyethylene sulfonic acid or salt thereof. The pH of the aqueous medium is then adjusted to 5 or less by the addition of an acid whereby the dispersed silver halide precipitates together with the gelatin. Most of the water-soluble impurities remain in the supernatant solution which is decanted.

We now have found that for the same purpose instead of the polyethylene sulfonic acid described in the specification of our U.S. patent application Serial No. 137,042, polymers can be used which bear sulfonic acid side-groups or salts thereof, as hereinafter defined.

According to the present invention in the preparation of a photographic gelatino silver halide emulsion, a method is found for removing water-soluble salts therefrom, which comprises adding to an aqueous gelatino silver halide dispersion an aqueous solution of a polymer bearing sulfonic acid side groups or salts thereof, adjusting the pH to 5 or less to cause precipitation of the gelatin together with the dispersed silver halide, and decanting the supernatant aqueous solution of the water-soluble salts, said polymer bearing sulfonic acid side-groups comprising in its molecular structure recurring structural units of at least one of the following formulae

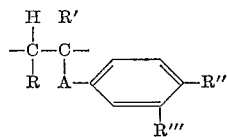

and

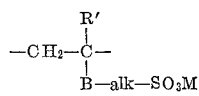

wherein

A is a

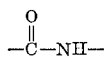

group, a

group, or a

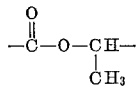

group,

B is a

group or a

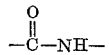

group,
R is a hydrogen atom or a carboxylic acid group,
R' is a hydrogen atom or a methyl group;
R" and R''' (which may be the same or different) each represent a hydrogen atom, a sulfonic acid group or a salt thereof, at least one of R" and R''' being a sulfonic acid group or a salt thereof;
Alk is a straight-chain or branched-chain alkyl group of 1 to 4 carbon atoms, and
M is a hydrogen atom, an alkali metal atom or an earth alkali metal atom.

If the polymers or copolymers comprise units of the first formula, other hydrogen atoms of the phenyl nucleus may also be replaced by substituents such as a methoxy group.

To precipitate the gelatin from its aqueous solution, it has been found that the pH has to be lowered to 5 or less; at such pH the gelatin precipitates and settles together with the silver halide. The settled precipitate consists of an in cold water insoluble complex of the polymer bearing sulfonic acid side-groups or salts thereof together with the gelatin and the silver halide grains. This precipitate can very easily be washed, whereby residual soluble impurities such as soluble salts can be removed.

When the polymer bearing sulfonic acid side-groups or salts thereof if added to the gelatin solution in the form of a salt such as a sodium or a potassium salt, it is necessary to acidify the mixture before getting a precipitate. However, the polymer bearing sulfonic acid side-groups can be added to the gelatin solution in its acid form in an amount such that the pH of the gelatin solution is lowered sufficiently for the gelatin to precipitate immediately.

According to a preferred embodiment of the present invention, 5 to 40% based on the weight of gelatin present, of an aqueous solution of a water-soluble polymer bearing sulfonic acid side-groups or salts thereof as hereinbefore defined, are added to a silver halide dispersion in gelatin, obtained by addition of an aqueous solution of silver nitrate to an aqueous solution of gelatin which contains potassium chloride and potassium bromide, whereafter the pH of the medium is lowered to 5 or less by the addition of a certain amount of an acid. The complex of the gelatin and the silver halide precipitates immediately. The supernatant aqueous solution containing the water-soluble impurities which are to be removed is decanted and, if desired, the precipitate is washed with cold water. Redispersion of the precipitate in water is brought about by raising the temperature to 30–40° C., and adding alkali to bring the pH to between 6 and 10. Additional amounts of gelatin or other hydrophilic colloids are added in order to obtain an emulsion with the desired properties.

Although amounts of the polymer bearing sulfonic acid side groups or salts thereof up to 20% of the gelatin present are quite sufficient for the purpose in view, amounts of 40% and more may be used. The optimum amount, of course, depends on different factors such as the concentration of the gelatin in the gelatino silver halide emulsion, the temperature at which precipitation occurs and the concentration of the soluble salts.

The pH at which precipitation occurs likewise depends on different factors among which the concentration of soluble salts is of great importance. A precipitate is usually obtained at a pH between 5 and 2.

Polymers bearing sulfonic acid side-groups or salts thereof having widely varying molecular weights can be used for the purposes of the present invention. However, it has been found that the amount of said polymers necessary for precipitating a certain amount of gelatin decreases with increasing molecular weight of the polymer. Besides that fact a high molecular weight polymer makes possible the precipitation of the gelatin at a higher pH. With polymers bearing sulfonic acid side-groups or salts thereof and which are of high-molecular weight, an increase of the viscosity of the solution is observed before coagulation as well as after redissolution. If it is desired to obtain a coating composition of high viscosity, it is evident that a polymeric compound of high-molecular weight should be used.

As polymers and copolymers bearing sulfonic acid side-groups or salts thereof which can be applied according to the invention, can be named among others:

(a) Polymers and copolymers of substituted acryl- and methacrylamines of the formula:

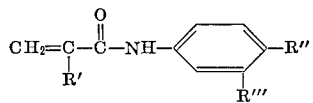

(b) Polymers and copolymers of substituted acrylates and methacrylates of the formula:

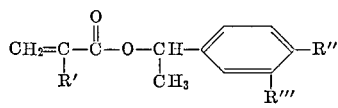

(c) Polymers and copolymers of substituted vinyl esters of the formula:

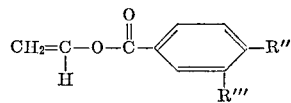

(d) Copolymers of substituted maleamic acid of the formula:

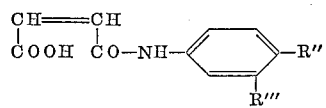

(e) Polymers and copolymers of substituted acrylates and methacrylates of the formula:

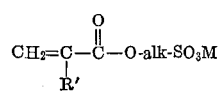

(f) Polymers and copolymers of substituted acryl- and methacrylamides of the formula:

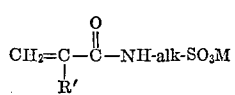

In these formulae alk, M, R', R" and R'" have the same significances as set forth above.

All the polymers and copolymers bearing sulfophenyl side groups can for instance be prepared by hydrolysis of the corresponding polymers and copolymers comprising fluorosulfonylphenyl side-groups, by a method such as described in the specifications of the U.S. patent applications Serial Nos. 113,630 and 113,632.

The sulfoalkyl-substituted polyacrylates and polymethacrylates are obtained by reaction of polyacrylyl chloride or of polymethacrylylchloride with an hydroxyalkyl sulfonic acid.

The sulfoalkyl substituted polyacrylamides and polymethacrylamides are obtained by reaction of polyacrylyl chloride or of polymethacrylyl chloride with an aminoalkyl sulfonic acid.

In the two last cases under polyacrylyl chloride and polymethacrylyl chloride are understood homopolymers of acrylyl chloride or of methacrylyl chloride as well as copolymers containing acrylyl chloride and methacrylyl chloride units.

The sulfoalkyl-substituted polyacrylates, polymethacrylates, polyacrylamides and polymethacrylamides can also be obtained by homopolymerization or copolymerization of the sulfoalkyl substituted acrylates, methacrylates, acrylamides and methacrylamides.

The following examples illustrate the present invention without limiting, however, the scope thereof.

EXAMPLE 1

Poly(vinyl-m-sulfobenzoate) of the formula

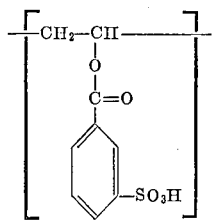

is prepared by reaction of poly(vinyl alcohol) with m-fluorosulfonyl benzoyl chloride and hydrolysis of the obtained polymer, such as described in Example 11 of the U.S. patent application Serial No. 113,632.

To a silver halide dispersion in gelatin, obtained by addition of an aqueous solution of 100 g. of silver nitrate to an aqueous solution of 20 g. of gelatin which contains potassium bromide and potassium chloride is added an aqueous solution of the sodium salt of the above poly-(vinyl-m-sulfobenzoate) until the proportion of gelatin to polymer in the solution is about 6.

The pH of this solution is lowered to 4 by adding sulfuric acid whereby the silver halide precipitates together with the gelatin-polymer complex.

The supernatant liquid is decanted and the precipitate is washed with water.

For redissolving, water is added until a total volume of about 250 ml. is obtained. Then the pH is raised to 7 by adding sodium hydroxide whereupon the mixture is heated to about 45° C. Next, this solution is added to 1000 ml. of a 8% gelatin solution, which solution is further treated until the desired photographic and coating characteristics are obtained. The emulsion is applied to a support, solidified and dried. The emulsion layer thus obtained shows good photographic characteristics.

EXAMPLE 2

Poly[N-(m-sulfo-p-methoxy-phenyl) - acrylamide] of the formula

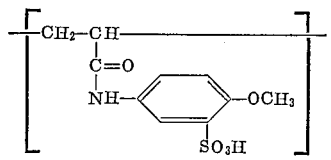

is obtained by the polymerization of N-(m-fluorosulfonyl-p-methoxyphenyl)-acrylamide and hydrolysis of the obtained poly[N-(m-fluorosulfonyl - p - methoxy-phenyl)-acrylamide], such as described in Example 5 of the U.S. patent application Serial No. 113,690.

To 1000 cm.$^3$ of a 5% aqueous solution at pH 7 and 42° C. of a gelatin with iso-electric point 4.8 are added 200 ml. of a 5% neutralized aqueous solution of the above poly[N-(m-sulfo-p-methoxyphenyl) - acrylamide]. Next, the gelatin solution is acidified to pH 4, whereby a very compact precipitate consisting of an insoluble complex of gelatin and polymer is formed. This precipitate is washed with cold water and redissolved in the same way as described in Example 1.

In the above example an aqueous solution of pure gelatin has been used for proving the precipitating power in acidic medium of the polymer bearing sulfonic acid side groups. In the same way the poly[N-(m-sulfo-p-methoxyphenyl)-acrylamide] could have been added to a light-sensitive silver halide dispersion in an aqueous gelatin solution. After acidifying the dispersion to pH 4 the silver halide would also precipitate with the gelatin-polymer complex leaving in solution the water-soluble impurities which then can be decanted.

The above poly[N-(m-sulfo-p-methoxy-phenyl)-acrylamide] may also be replaced by other sulfonated acrylamides, e.g. by poly[N-sulfophenyl-acrylamides] in which the sulfonic acid group is substituted in the meta- or para-position and in which one or more hydrogen atoms of the phenyl nucleus have been substituted by halogen, alkyl, methoxy, a tertiary amino group, and the like.

EXAMPLE 3

Copoly[ethylene/M-(m-sulfophenyl) - maleamic acid] of the formula

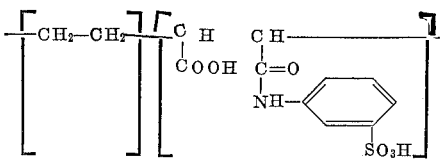

is prepared by reaction of copoly(ethylene/maleic anhydride) with m-aminobenzene sulfonyl fluoride and hydrolisis of the copoly[ethylene/N-(m-fluorosulfonylphenyl)-maleamic acid] obtained, such as described in Example 2 of the U.S. patent application Serial No. 113,632.

To 1000 cm.³ of a 5% aqueous solution at pH 7 and 42° C. of a gelatin with iso-electric point 9 are added 200 ml. of a 5% aqueous solution of the potassium salt of the above copoly[ethylene/N-(m-sulfophenyl)-maleamic acid] at pH 7. The gelatin solution is acidified to pH 3.5, whereby a very compact precipitate is formed. This precipitate is washed with cold water and redissolved in the same way as described in Example 1.

EXAMPLE 4

Copoly[acrylic acid/N-(m-sulfophenyl) - acrylamide] of the formula

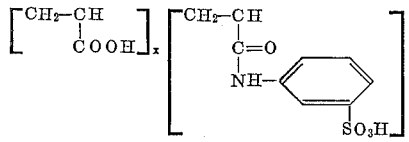

is prepared by copolymerizing acrylic acid and N-(m-fluorosulfonyl phenyl)-acrylamide and hydrolyzing the obtained copolymer, such as described in Example 6 of the U.S. patent applictaion Serial No. 113,630.

To 1000 ml. of a 5% aqueous solution at pH 7 and 42° C. of a gelatin with iso-electric point 4.9 are added 200 ml. of a 5% aqueous solution of the above copoly-[acrylic acid/N-(m-sulfophenyl)-acrylamide] at pH 7. The gelatin solution is acidified to pH 4, whereby a very compact precipitate is formed. This precipitate is washed with cold water and redissolved in the same way as described in Example 1.

The above copoly[acrylic acid/N-(m-sulphophenyl)-acrylamide] can also be prepared according to the method described in Example 1 of the U.S. patent application Serial No. 113,632. In this example poly(acrylyl chloride) is reacted with m-amino-benzene sulfonyl fluoride and the poly[N-(m-fluorosulfonyl phenyl)-acrylamide] obtained is hydrolyzed to poly[N-(m-sulfophenyl)-acrylamide]. When according to this method m-aminobenzene sulfonyl fluoride is used in an amount smaller than indicated, a copolymer is obtained which in addition to the N-(m-fluorosulfonyl phenyl)-acrylamide) units still contains some acrylic acid units. The former units are also hydrolyzed to N-(m-sulfophenyl)-acrylamide units as indicated.

EXAMPLE 5

Poly-N-(m-sulfophenyl)-methacrylamide of the formula:

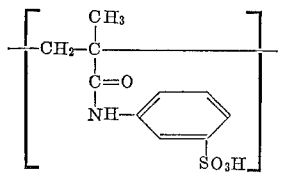

is obtained by polymerizing N-(m-fluorosulfonyl phenyl)-methacrylamide and hydrolyzing the polymer obtained such as described in Example 3 of the U.S. patent application Serial No. 113,630.

To 1000 ml. of a 5% aqueous solution at pH 7 and 42° C. of a gelatin with iso-electric point 4.9 are added 200 ml. of a 5% aqueous solution of the potassium salt of the above poly[N-(m-sulfophenyl)-methacrylamide] at pH 7.

The gelatin solution is acidified to pH 4, whereby a very compact precipitate is formed. This precipitate is washed with cold water and redissolved in the same way as described in Example 1.

EXAMPLE 6

Poly[1-(m-sulfophenyl)-ethyl acrylate] of the formula

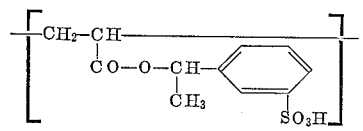

is obtained by polymerizing 1-(m-fluorosulfonyl phenyl)-ethylacrylate and hydrolyzing the polymer formed such as described in Example 13 of the U.S. patent application Serial No. 113,630.

To 1000 ml. of a 5% aqueous solution at pH 7 and 35° C. of a gelatin with iso-electric point 4.8 are added 100 ml. of a 10% aqueous solution of the above poly[1-(m-sulfophenyl)-ethyl acrylate]. The solution is acidified with sulfuric acid to pH 4, whereby the formed complex of gelatin and polymer precipitates. This precipitate is washed with cold water.

When the sulfuric acid is sufficiently washed away, the precipitate is redissolved in 1000 ml. water at 45° C.

EXAMPLE 7

Poly(N-2-sulfoethyl acrylamide) according to the formula

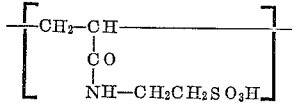

is prepared as follows:

(a) *Preparation of the monomer.*—0.1 mol of 2-aminoethane sulfonic acid, prepared from bromoethane sulfonic acid and ammonium hydroxide according to the method described in Organic Synthesis, 10, 98 (1930), and 0.11 mol of sodium hydroxide are dissolved in 70 cm.³ of water. The solution is cooled till 0° C. and whilst stirring, 0.12 mol of acrylyl chloride is slowly added. After reacting, the solution is stirred for further 15 min. at 0°

C., whereupon the water is evaporated in vacuum. The residue is twice washed with ethyl alcohol. Yield: 60%. Potentiometric titration indicates the presence of 2% of sodium chloride.

(b) *Polymerisation.*—9 g. of the above monomer dissolved in 50 cm.³ of water are polymerized at 70° C. using 300 mg. of potassium persulfate as an initiator. The formed polymer is separated by pouring the viscous solution in excess of methyl alcohol. Yield: 7 g. Potentiometric titration indicates the presence of 1.8% of sodium chloride.

(c) *Precipitation of gelatin from its aqueous solution.*— To 100 cm.³ of a 10% aqueous solution of gelatin with iso-electric point 4.9 at pH 7 and at 42° C., 20 cm.³ of a 10% aqueous solution of the above prepared poly(N-sulfoethyl acryl amide) are added. Thereupon the solution is acidified to pH 5 whereby a compact precipitate of an insoluble complex of gelatin and the polymer is formed. This precipitate is washed with cold water.

In order to redissolve the precipitate, 100 cm.³ of water are added, the pH is brought at 7 with sodium hydroxide and the mixture is warmed to 45° C.

EXAMPLE 8

Poly[3-sulfopropyl methacrylate] of the formula

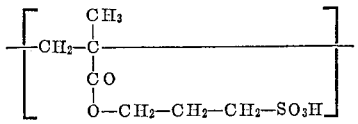

is prepared as follows:

(a) *Preparation of the monomer.*—In a three-necked flask, fitted with a stirrer, a thermometer, a reflux condenser, bearing a tube filled with calcium chloride, and a dropping funnel, are brought 100 cm.³ of n-heptane, 0.2 mol of the sodium salt of 3-hydroxypropane sulfonic acid and 300 mg. of m-dinitrobenzene. The mixture is heated to 60-65° C. and 0.22 mol of methacrylyl chloride is added slowly. After stirring for 2 h. at the boiling temperature the mixture is cooled, the precipitate separated and then washed twice with ether. After drying the product is dissolved in water. The obtained acid solution comprises a little precipitate which is filtered off whereupon the solution is neutralized with about 0.5 cm.³ of 5 N sodium hydroxide.

(b) *Polymerization.*—The solution of the monomer is brought in a pressure tube together with 400 mg. of potassium persulfate and 370 mg. of sodium bisulfite 7 aq. After rinsing the solution with nitrogen the sealed pressure tube is placed for 20 h. in an oil-thermostat at 60° C. After polymerization, the polymer is separated by pouring the solution into a mixture of methanol and ether (10/1). The precipitate is then filtered and dried. Yield: 20 g. According to the sulfur analysis, the polymer comprises 93% of the sodium salt of poly(sulfopropyl methacrylate).

(c) *Precipitation of gelatin from its aqueous solution.*— To 100 cm.³ of a 10% aqueous solution of gelatin with iso-electric point 4.9 at pH 7 and at 42° C., 20 cm.³ of a 10% aqueous solution of the above prepared sodium salt of poly (sulfopropyl methacrylate) are added. Thereupon the solution is acidified to pH 4 whereby a compact precipitate consisting of the insoluble complex of gelatin and polymer is formed. This precipitate is washed with cold water and redissolved by applying the same treatment as in Example a.

If in the above preparation the sodium salt of 4-hydroxybutane sulfonic acid is used as starting material, the sodium salt of poly(sulfobutyl methacrylate) is obtained after polymerization. This sodium salt can be used in the precipitation of the gelatin from its aqueous solution at a pH lower than 5.

We claim:
1. A method for removing water-soluble salts from aqueous gelatino silver halide dispersions which comprises adding to an aqueous gelatino silver halide dispersion an aqueous solution of a polymer from the group consisting of polymers bearing sulfonic acid side-groups and salts thereof, adjusting the pH to a precipitating pH within the range of 2–5 to cause precipitation of the gelatin together with the dispersed silver halide, and decanting the supernatant aqueous solution containing the water-soluble salts, said polymer bearing sulfonic acid side-groups comprising in its molecular structure recurring structural units of at least one of the following formulae:

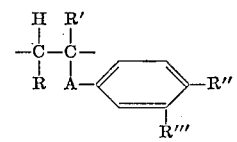

and

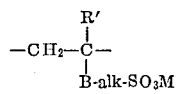

wherein:
A is selected from the group consisting of a

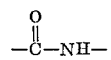

group, a

group, and a

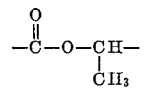

group,
B is selected from the group consisting of a

group and a

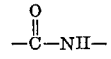

group,
R is selected from the group consisting of a hydrogen atom and a carboxylic acid group,
R' is selected from the group consisting of a hydrogen atom and a methyl group,
R'' and R''', at least one of them being selected from the group consisting of a sulfonic acid group and a salt thereof, the other being selected from the group consisting of a hydrogen atom, a sulfonic acid group and a salt thereof;
alk is an alkyl group of 1 to 4 carbon atoms, and
M is selected from the group consisting of a hydrogen atom, an alkali metal atom and an alkaline earth metal atom.

2. Method according to claim 1 wherein the polymer bearing sulfonic acid side groups is poly(vinyl-m-sulfobenzoate).

3. Method according to claim 1 wherein the polymer bearing sulfonic acid side groups is poly[N-(m-sulfo-p-methoxyphenyl)-acrylamide].

4. Method according to claim 1 wherein the polymer bearing sulfonic acid side groups is poly[N-(m-sulfophenyl)-methacrylamide].

5. Method according to claim 1 wherein the polymer bearing sulfonic acid side groups is poly[1-(m-sulfophenyl-ethyl acrylate].

6. Method according to claim 1 wherein the polymer bearing sulfonic acid side groups is poly(N-2-sulfoethyl acrylamide).

7. Method according to claim 1 wherein the polymer bearing sulfonic acid side groups is poly[3-sulfophenyl methacrylate].

References Cited by the Examiner

UNITED STATES PATENTS 2,728,662  12/1955  Yutzy et al. _____ 96—94

FOREIGN PATENTS 561,484  10/1957  Belgium.
861,984  3/1961  Great Britain.

NORMAN G. TORCHIN, *Primary Examiner.*